(12) United States Patent
Kwon et al.

(10) Patent No.: US 8,520,629 B2
(45) Date of Patent: Aug. 27, 2013

(54) METHOD AND APPARATUS FOR PERFORMING PICONET COORDINATOR HANDOVER IN WIRELESS PERSONAL AREA NETWORK

(75) Inventors: Chang-yeul Kwon, Yongin-si (KR); Seong-soo Kim, Seoul (KR); Ji-sung Oh, Seongnam-si (KR); Jae-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 12/268,792

(22) Filed: Nov. 11, 2008

(65) Prior Publication Data

US 2009/0129337 A1    May 21, 2009

Related U.S. Application Data

(60) Provisional application No. 60/987,580, filed on Nov. 13, 2007.

(30) Foreign Application Priority Data

Jul. 10, 2008   (KR) .................. 10-2008-0067212

(51) Int. Cl.
*H04B 1/00* (2006.01)
*H04B 7/01* (2006.01)
*H04W 4/00* (2009.01)

(52) U.S. Cl.
USPC ........... 370/331; 370/328; 370/338; 370/345; 370/349; 370/446; 370/431; 375/132; 375/134; 455/63.1; 455/432.1; 455/435.2; 455/444; 455/574; 455/41.2; 455/456.1; 455/456.2

(58) Field of Classification Search
USPC . 370/228–476; 455/63.1–574; 375/130–136
See application file for complete search history.

(56) References Cited

U.S. PATENT DOCUMENTS 7,245,947 B2 * 7/2007 Salokannel et al. .......... 455/574
7,277,412 B2 * 10/2007 Sugaya et al. ................ 370/337
7,333,814 B2 * 2/2008 Roberts ..................... 455/452.2

(Continued)

FOREIGN PATENT DOCUMENTS

| KR | 10-2005-0102702 A | 10/2005 |
| KR | 10-0691288 B1 | 2/2007 |
| KR | 10-2008-0020424 A | 3/2008 |

OTHER PUBLICATIONS

IEEE 802.15.3 Task Group 3c (TG3c),2005, a millimeter-wave-based alternative physical layer (PHY) for the existing 802.15.3 Wireless Personal Area Network (WPAN) Standard 802.15.3-2003, (www.ieee802.org).*

(Continued)

*Primary Examiner* — Ayaz Sehikh
*Assistant Examiner* — Venkatesh Haliyur
(74) *Attorney, Agent, or Firm* — Sughrue Mion, PLLC

(57) ABSTRACT

Provided are a method and an apparatus for performing a piconet coordinator (PNC) handover in a wireless personal area network (WPAN) in which devices using various PHY transmission modes coexist. A device that enters the WPAN transfers information about its PHY transmission mode to the PNC through an association request message so that a problem that conventional services are not provided to a user in the WPAN due to a difference in PHY transmission modes of the devices during the PNC handover can be solved.

12 Claims, 5 Drawing Sheets

(56) References Cited

U.S. PATENT DOCUMENTS

| | | | |
|---|---|---|---|
| 7,366,418 B2* | 4/2008 | Kwon et al. | 398/115 |
| 7,447,178 B2* | 11/2008 | Kim et al. | 370/331 |
| 7,447,503 B2* | 11/2008 | Shvodian | 455/435.2 |
| 7,463,886 B2* | 12/2008 | Salokannel et al. | 455/426.1 |
| 7,474,686 B2* | 1/2009 | Ho | 375/132 |
| 7,496,065 B2* | 2/2009 | Anjum et al. | 370/328 |
| 7,529,212 B2* | 5/2009 | Sugaya et al. | 370/337 |
| 7,570,627 B2* | 8/2009 | Welborn et al. | 370/345 |
| 7,664,030 B2* | 2/2010 | Sugaya | 370/235 |
| 7,796,555 B2* | 9/2010 | Jeon et al. | 370/331 |
| 8,144,670 B2* | 3/2012 | Shin et al. | 370/336 |
| 8,149,794 B2* | 4/2012 | Shin et al. | 370/336 |
| 2004/0008641 A1* | 1/2004 | Sugaya et al. | 370/321 |
| 2004/0142690 A1* | 7/2004 | Eom et al. | 455/436 |
| 2004/0147267 A1* | 7/2004 | Hill et al. | 455/456.1 |
| 2004/0170217 A1* | 9/2004 | Ho | 375/134 |
| 2004/0218683 A1* | 11/2004 | Batra et al. | 375/261 |
| 2004/0246993 A1* | 12/2004 | An | 370/469 |
| 2005/0059420 A1* | 3/2005 | Salokannel et al. | 455/522 |
| 2005/0075084 A1* | 4/2005 | Salokannel et al. | 455/126 |
| 2005/0078646 A1* | 4/2005 | Hong et al. | 370/338 |
| 2005/0089058 A1* | 4/2005 | Hong et al. | 370/445 |
| 2005/0122944 A1* | 6/2005 | Kwon et al. | 370/338 |
| 2006/0227740 A1* | 10/2006 | McLaughlin et al. | 370/329 |
| 2007/0280184 A1* | 12/2007 | Shin et al. | 370/338 |
| 2007/0280237 A1* | 12/2007 | Shin et al. | 370/390 |
| 2007/0291853 A1* | 12/2007 | Kim et al. | 375/240.27 |
| 2008/0013498 A1* | 1/2008 | Sugaya et al. | 370/337 |
| 2008/0112368 A1* | 5/2008 | Kwon | 370/336 |
| 2008/0112369 A1* | 5/2008 | Kwon | 370/336 |
| 2008/0112370 A1* | 5/2008 | Kwon | 370/336 |
| 2008/0232393 A1* | 9/2008 | Dharmaraju et al. | 370/453 |
| 2009/0135772 A1* | 5/2009 | Kwon et al. | 370/329 |
| 2009/0168650 A1* | 7/2009 | Kesselman | 370/235 |
| 2009/0257397 A1 | 10/2009 | Kwak et al. | |
| 2010/0016023 A1* | 1/2010 | Yamauchi et al. | 455/562.1 |

OTHER PUBLICATIONS

A design of single carrier based PHY for IEEE 802.15.3c standard, Funada et al, 2007 IEEE, PIMRC'07.*

Throughput Comparison of Multi-Gbps WPAN (IEEE 802.15.3c) PHY Layer Desings Under Non-Linear 60 GHz Power Amplifier, Lei et al, 2007 IEEE, PIMRC'07.*

Decision of Grant dated Sep. 27, 2010, issued in corresponding Korean Patent Application No. 10-2008-0067212.

Siaud Isabelle et al., "A Novel Adaptive sub-carrier Interleaving application to millimeter-wave WPAN OFDM Systems (IST MAGNET project)" Proceedings of IEEE international Conference on Portable Information Devices 2007, pp. 1-7, 2007.

* cited by examiner

FIG. 1

| Order | Information | Note |
|---|---|---|
| 1 | PNC Des-mode bit in PNC capabilities field | PNC Des-mode=1 is preferred |
| 2 | SEC bit in PNC capabilities field | SEC=1 is preferred |
| 3 | PSRC bit in PNC capabilities field | PSRC=1 is preferred |
| 4 | Max associated DEVs | Higher value is preferred |
| 5 | Max CTRqBs | Higher value is preferred |
| 6 | Transmitter power level (PHY dependent) | Higher value is preferred |
| 7 | MAX PHY rate (PHY dependent) | Higher value is preferred |
| 8 | DEV address | Higher value is preferred |

METHOD AND APPARATUS FOR PERFORMING PICONET COORDINATOR HANDOVER IN WIRELESS PERSONAL AREA NETWORK

This application claims the benefit of U.S. Provisional Application No. 60/987,580, filed on Nov. 13, 2007, in the United States Patent and Trademark Office, and Korean Patent Application No. 10-2008-0067212, filed on Jul. 10, 2008, in the Korean Intellectual Property Office, the disclosures of which are incorporated herein in its entirety by reference.

The present invention relates to a wireless personal area network (WPAN), and more particularly, to a method and an apparatus for performing a piconet coordinator (PNC) handover in a wireless personal area network (WPAN). The PNC handover may be performed only between devices supporting the same PHY transmission mode so that conventional services can be provided to a user in the WPAN.

A wireless personal area network (WPAN) is a wireless network in which devices are separated from one another by a short distance and perform data communication with a low power.

In the WPAN, data communication is performed based on a time division multiple access (TDMA) method. Thus, devices that intend to perform data communication monopolize channels during channel time allocation (CTA) by devices called piconet coordinators (PNCs) and then perform data communication.

When these PNCs need to be changed like when devices having higher capabilities than the PNCs associate with the WPAN, or when the PNCs are disconnected from the WPAN, an operation of performing a PNC handover to another device is performed by a conventional device that functions as a PNC.

PNCs compare the capabilities of devices and select a device having the best capability from among the devices, as a new PNC associating with a WPAN.

According to an aspect of the present invention, there is provided a method of performing a piconet coordinator (PNC) handover, wherein the PNC handover is performed by a first device to a second device in a wireless personal area network (WPAN), the method including: determining whether the first device and the second device use the same PHY transmission mode by referring to information about the PHY transmission mode of the second device; and deciding whether the first device will perform the PNC handover to the second device based on the determination result.

The method may further include extracting information about the PHY transmission mode of the second device from an association request message that is received from the second device.

The extracting of information may include extracting information about the PHY transmission mode of the second device from a device capability information element of the association request message.

The extracting of information may include extracting information about the PHY transmission mode of the second device from a 'DEV capabilities' field of the device capability information element.

The information about the PHY transmission mode of the second device may indicate at least one PHY transmission mode selected from the group consisting of a single carrier (SC), on-off keying (OOK), and orthogonal frequency division multiplexing (OFDM).

A technique whereby a large capacity of data can be transmitted at a frequency band of 60 GHz in the WPAN, at high speed by using a millimeter wave having a short wavelength of 1-10 mm and strong directivity, has recently been developed. This technique can enable high definition or high quality multimedia (video/audio) contents to be transmitted without being compressed in the WPAN so as to overcome any problem associated with the transmission of compressed data (e.g., high cost, longer delay, codec support requirement and so forth) due to a certain limited bandwidth in the network.

According to another aspect of the present invention, there is provided a recording medium in which a program for executing the method is recorded.

According to another aspect of the present invention, there is provided an apparatus for performing a piconet coordinator (PNC) handover, wherein the PNC handover is performed by a first device to a second device in a wireless personal area network (WPAN), the apparatus including: a determination unit determining whether the first device and the second device use the same PHY transmission mode by referring to information about the PHY transmission mode of the second device; and decision unit deciding whether the first device will perform the PNC handover to the second device based on the determination result.

According to another aspect of the present invention, there is provided an apparatus for performing a piconet coordinator (PNC) handover, the PNC handover is performed by a first device to a second device in a wireless personal area network (WPAN), the apparatus comprising: an association request processing unit to receive and process an association request message from an external device; an extraction unit extracting information about a PHY transmission mode of the external device from the association request message; a handover processing unit to perform the handover to the external device; a bus coupling each unit of the device; at least one processor coupled to the bus; and at least one memory coupled to the bus to store instructions and to the at least one processor to execute and perform a method comprising: determining whether the first device and the second device use a same Physical Layer (PHY) transmission mode by referring to about the PHY transmission mode of the second device from a device capability information element of the association request message; deciding whether the first device can perform the PNC handover to the second device based on the determination result; and performing the PNC handover to the second device based on the deciding result.

Configuration and method of performing a piconet coordinator (PNC) handover according to an exemplary embodiment of the present invention can be implemented in a variety of manners, including the other wireless or wired communications environment, without departing from the scope of the present invention.

The above and other features and advantages of the present invention will become more apparent by describing in detail exemplary embodiments thereof with reference to the attached drawings in which:

FIG. 1 illustrates a table that is referred to when a PNC handover is performed;

Hereinafter, the present invention will be described in detail by explaining exemplary embodiments of the invention with reference to the attached drawings.

As illustrated in a table in FIG. 1, in a PNC handover, various information indicating capabilities of devices is analyzed and devices that will operate as PNCs are selected, and it is assumed that all devices in the WPAN use the same PHY transmission mode. Thus, the PHY transmission modes of the devices need not to be considered.

When devices having different PHY transmission modes coexist in the WPAN and particular PNCs perform a PNC handover by referring only to the table shown in FIG. 1, the particular PNCs and remaining PNCs may have different PHY transmission modes. In that case, the particular services may not be provided to a user. For example, when SC PNCs perform a PNC handover to an OFDM device, an SC device that receives services from SC PNCs does not process a message from the OFDM device. As a result, in the PNC handover, services that are being used by the SC device may not be provided to the user.

Figure 2A:
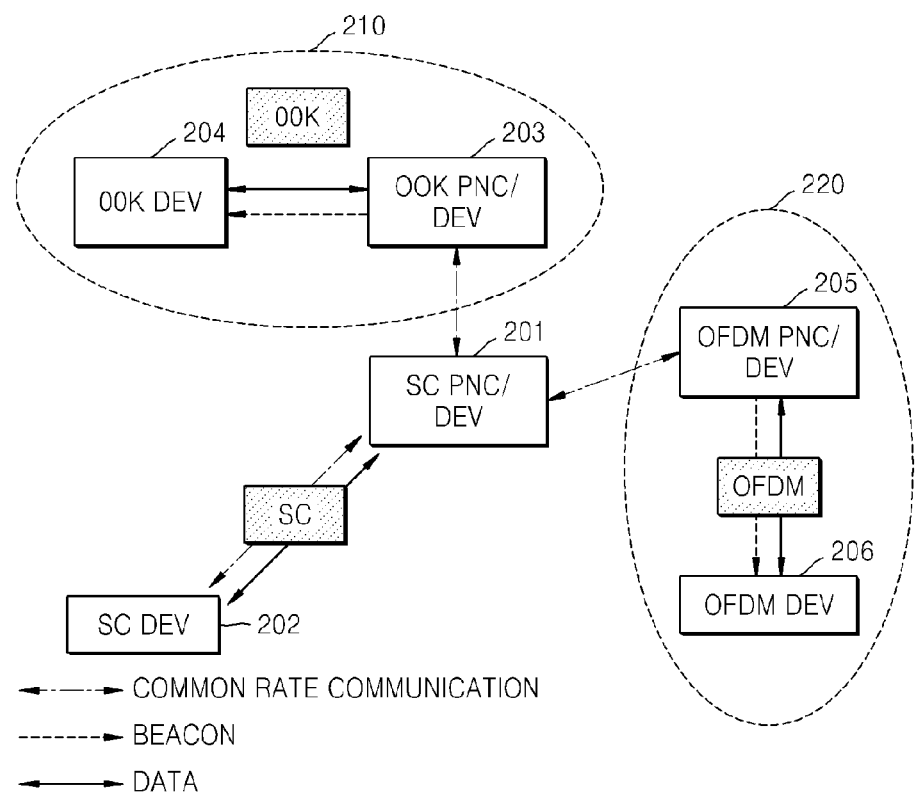
FIGS. 2A and 2B illustrate a method by which devices communicate with one another in a WPAN, according to an embodiment of the present invention.
Figure 2B:
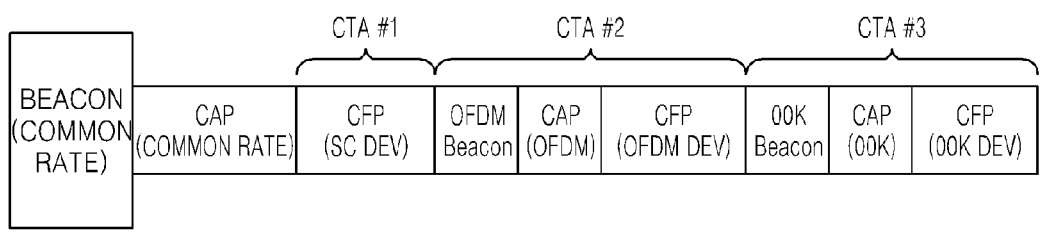

FIGS. 2A and 2B illustrate a method by which devices communicate with one another in a WPAN, according to an embodiment of the present invention.

An Ad-Hoc network includes 6 devices 201 to 206 in a wireless personal area network (WPAN) illustrated in FIG. 2A. The devices 201 to 206 comprise single carrier (SC) devices 201 and 202, on-off keying (OOK) devices 203 and 204, orthogonal frequency division multiplexing (OFDM) devices 205 and 206, according to physical layer protocols, i.e., PHY transmission modes. Hereinafter, a device using a SC-based PHY transmission mode is referred to as an SC device, and a device using an OOK-based PHY transmission mode is referred to as an OOK device, and a device using an OFDM-based PHY transmission mode is referred to as an OFDM device.

In FIG. 2A, the SC device 201 operates as a piconet coordinator (PNC). Since devices having different PHY transmission modes may not communicate one another, the SC device 201 can perform data communication only with the SC device 202. When the SC device 201 does not communicate with the OOK devices 203 and 204 and the OFDM devices 205 and 206, a channel time cannot be allocated to the OOK devices 203 and 204 and the OFDM devices 205 and 206. Thus, in the WPAN, according to an exemplary embodiment of the present invention, devices using the same PHY transmission mode constitute child piconets 210 and 220, and the OOK device 203 and the OFDM device 205, supporting a PNC function respectively in the child piconets 210 and 220, operate as a PNC in their respective child piconets 210 and 220.

Since a channel time is allocated to the SC devices 201 and 202, the OOK devices 203 and 204, and the OFDM devices 205 and 206 by the SC device 201 using signaling, the signaling must be performed at least between a PNC of a parent piconet and the OOK device 203 and the OFDM device 205 of the child piconets 210 and 220. Here, signaling indicates a sort of communication that is distinguished from data communication and is a method of transmitting and receiving a message for constituting/controlling a communication environment in a piconet. Beacon, probe request/response, association request/response, and the like, are transmitted/received to/from the devices by using signaling.

Thus, the SC devices 201 and 202, and the OOK device 203, supporting a PNC function in the WPAN according to the present embodiment of the present invention, must support at least one common PHY transmission mode that is hereinafter referred to as a common rate or mode. For example, the common rate may be designated to 50 Mbps from among data rates based on an SC mode.

A channel time is allocated to the OOK device 203 and the OFDM device 205 of the child piconets 210 and 220 by the SC device 201 of the parent piconet by using signaling based on the common rate. The channel time allocated to the OOK device 203 and the OFDM device 205 of the child piconets 210 and 220 is a super frame length of a corresponding child piconet. In the child piconets 210 and 220, all of the signaling and data communication are performed based on a common PHY transmission mode to the child piconets 210 and 220. In other words, signaling and data communication are performed based on the OOK PHY in the child piconet 210 and based on the OFDM PHY in the child piconet 220, respectively.

FIG. 2B illustrates a super frame structure of the WPAN illustrated in FIG. 2A, according to an embodiment of the present invention. As illustrated in FIG. 2A, the SC device 201 of the parent piconet broadcasts a Beacon frame based on the common rate to the WPAN. When it is assumed that the common rate is a basic data rate based on an SC mode, only the SC device 202 and a PNC function supporting devices (e.g., the OOK device 203 and the OFDM device 205) may interpret the Beacon frame.

Thus, in a competition access period (CAP), channel times corresponding to CTA1, CTA2, and CTA3, respectively, can be allocated to the SC device 202, the OFDM device 205, and the OOK device 203. As described earlier, the channel time allocated to a PNC of a child piconet may correspond to a super frame length in the child piconet. Devices of the child piconet 210 perform signaling and data communication through the OOK PHY, and devices of the child piconet 220 perform signaling and data communication through the OFDM PHY.

In accordance with an exemplary embodiment of the preset invention as illustrated in FIGS. 2A and 2B, devices using different PHY transmission modes from one another may also exist in the same WPAN if they communicate one another in common communication rate. In order to provide seamless services to the devices when PNC handover is performed, it is recommended to determine whether a new device acting as a PNC supports the same PHY transmission mode as the device.

Configuration and method method of performing a piconet coordinator (PNC) handover in a WPAN according to an exemplary embodiment of the present invention can be implemented in a variety of manners without departing from the scope of the present invention.

Figure 3:
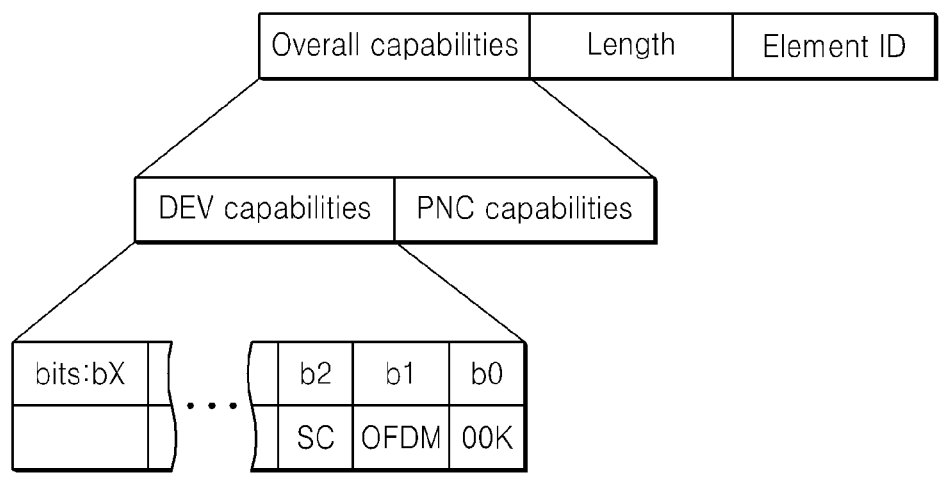
FIG. 3 illustrates the structure of a device capability information element used in a WPAN, according to an embodiment of the present invention.

FIG. 3 illustrates the structure of a device capability information element used in a WPAN, according to an embodiment of the present invention. As stipulated in the IEEE 802.15.3 standard, the device capability information element is included in an association request message, and a probe response message. In accordance with an exemplary embodiment of the present invention, information indicating a PHY transmission mode of a corresponding device is included in the device capability information element.

As illustrated in FIG. 3, according to an exemplary embodiment of the present invention, information indicating a PHY transmission mode of the device may be recorded on a 'DEV capabilities' field within an 'Overall capabilities' field of the device capability information element. In other words, the determination on whether devices support SC, OFDM, and OOK transmission modes may be indicated with a one-bit flag.

As described above, the device capability information element can be included in the association request frame. Thus, by utilizing the device capability information element of FIG. 3, a conventional PNC may check a supportable PHY transmission mode, as well as the capability of a new device, through the association request frame of the device when the new device requests to connect to the WPAN.

A plurality of transmission methods may be available to OFDM by using various sampling frequencies. Since OFDM devices having different transmission methods from one another cannot communicate with one another, information about which transmission method is used among the OFDM transmission methods can be included in the device capability information element.

Figure 4:
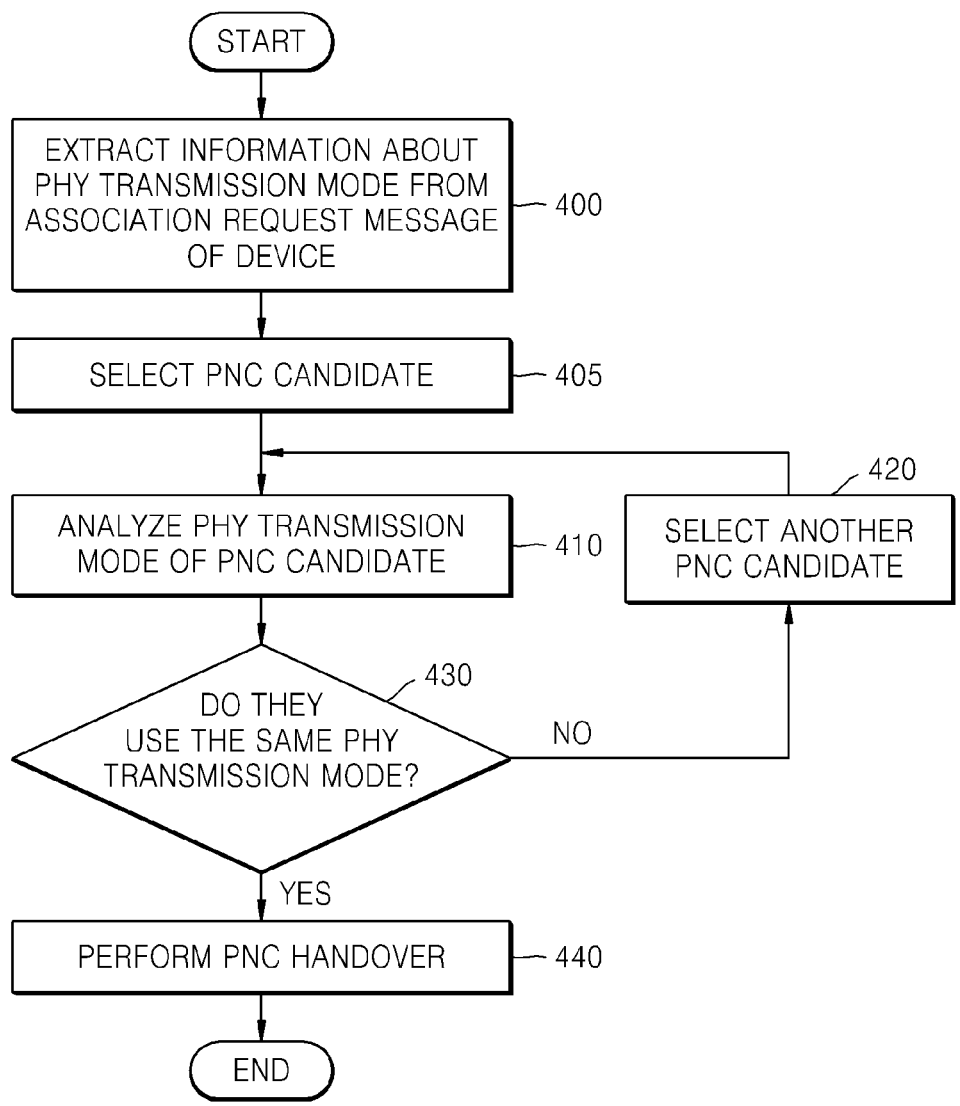
FIG. 4 is a flowchart illustrating a method of performing a PNC handover by using a conventional PNC, according to an embodiment of the present invention.

FIG. 4 is a flowchart illustrating a method of performing a PNC handover by using a current PNC, according to an exemplary embodiment of the present invention.

In operation 400, the current PNC extracts information about a PHY transmission mode from an association request message of a device that newly enters a WPAN.

In operation 405, the existing PNC may select a candidate device that can newly act as a PNC among devices in the WPAN. A reference for selecting a PNC candidate may be adopted by using various methods, and the table shown in FIG. 1 may be used as the reference.

In operations 410 and 420, the current PNC analyzes a PHY transmission mode of the candidate device selected in operation 405 by using information extracted in operation 400.

In operation 430, if the PHY transmission mode of the candidate device is not the same as that of the current PNC, another candidate can be selected. The table shown in FIG. 1 may be repeatedly used as a reference.

In operation 440, if it is determined in operation 430 that the PHY transmission mode of the candidate device is the same as that of the current PNC, the PNC handover is performed. When the PNC handover is performed, the candidate device becomes a new PNC.

In accordance with an exemplary embodiment of the present invention, after the PNC candidate is selected and then the comparison between the PHY transmission modes of the candidate device and the current PNC is performed. However, in another embodiment, devices having the same PHY transmission mode as that of the current PNC are selected first, and then a new PNC may be selected among the devices according to a predetermined reference (for example, the table shown in FIG. 1).

Furthermore, in accordance with an exemplary embodiment of the present invention, information about PHY transmission modes of the devices is provided to the current PNC through the association request message. However, information about PHY transmission modes of the devices may be provided to the current PNC through an existing message or a newly-defined message according to various embodiments of the present invention.

Figure 5:
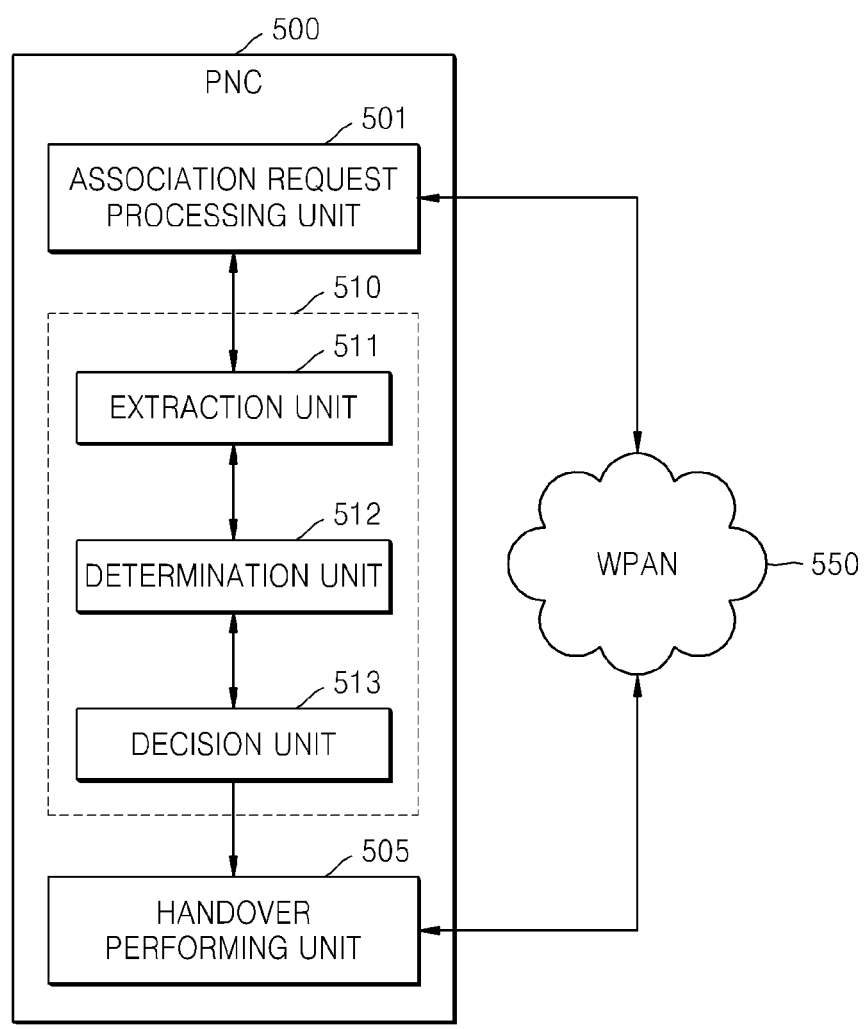
FIG. 5 illustrates the structure of a WPAN device according to an embodiment of the present invention.

FIG. 5 illustrates the structure of a WPAN device 500 according to an embodiment of the present invention.

As illustrated in FIG. 5, the WPAN device 500, according to an exemplary embodiment of the present invention, comprises an association request processing unit 501, a capability comparison unit 510, and a handover performing unit 505.

The association request processing unit 501 receives an association request message from a device (not shown) that newly enters a WPAN 550, and responds to the received association request message.

The capability comparison unit 510 comprises an extraction unit 511, a determination unit 512, and a decision unit 513. The extraction unit 511 can extract information about a PHY transmission mode from the association request message. As described above, the PHY transmission mode may be recorded on a 'DEV capabilities' field of a device capability information element.

The determination unit 512 may compare capabilities of devices in the WPAN to select a PNC candidate and determine whether a device selected as a PNC candidate supports the same PHY transmission mode as that of the WPAN device 500, currently functioning as a PNC, based on extracted information by the extraction unit 511 about a PHY transmission mode.

If the candidate device uses the same PHY transmission mode as that of the WPAN device 500, currently functioning as a PNC, as a result of the determination of the determination unit 512, the decision unit 513 can decide the candidate device as a new PNC. Otherwise, the decision unit 513 decides the candidate device as not the new PNC but instead allows the determination unit 512 to select a new candidate device.

The handover performing unit 505 performs a PNC handover to the device decided as a new PNC by the decision unit 513.

Configuration and method of performing a PNC handover by using a current PNC according to an exemplary embodiment of the present invention can be implemented in a variety of manners and comprise other units without departing from the scope of the present invention. For example, an apparatus for allocating a channel time in a WPAN according to an exemplary embodiment of the present invention can comprise a bus coupling each unit of the apparatus as shown in FIG. 5, at least one processor coupled to the bus, a memory coupled to the bus to store instructions and to the at least one processor to execute instructions of generating the data frame as described earlier.

The present invention can be compatible with technologies such as 802.11x and 802.15.3.

The present invention can also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, and optical data storage devices. Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation.

Thus, various physical layer (PHY) transmission modes, such as a single carrier (SC), orthogonal frequency division multiplexing (OFDM), on-off-keying (OOK), can be used in the WPAN.

WPAN in accordance with an exemplary aspect of the present invention may be applicable to various applications as a wire or cable replacement technology for home entertainment systems capable of transmitting and receiving high definition video and audio, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention can be applied in alternative networks including 802.11, wireless fidelity ("WIFI") network, Ultra-wide band ("UWB"), Piconet, ZigBee, and/or any other wireless communication network topology or protocol. The wireless communication devices such as the apparatus in FIG. 9 can be any of a variety of wireless communication devices including but not limited to a computer, mobile computer, cell phone, personal digital assistant ("PDA"), game console, TV or set-top box with wireless capability, DVD or Blueray ("BD") compatible media player, radio frequency identification device ("RFID"), or any other stationary or mobile apparatus.

What is claimed is:

1. A method of performing a piconet coordinator (PNC) handover, the PNC handover performed by a first device to a second device in a wireless personal area network (WPAN), the method comprising:
   determining whether the first device and the second device use a same Physical Layer (PHY) transmission mode by referring to information about the PHY transmission mode of the second device;
   deciding whether the first device can perform the PNC handover to the second device based on the determination result;
   performing the PNC handover to the second device based on the deciding result; and
   extracting information about the PHY transmission mode of the second device from an association request message that is received from the second device,
   wherein the extracting of information comprises extracting information about the PHY transmission mode of the second device from a device capability information element of the association request message, and
   wherein a PHY transmission mode of the first device is at least one of a single carrier (SC), on-off keying (OOK), and orthogonal frequency division multiplexing (OFDM).

2. The method of claim 1, wherein the extracting of information comprises extracting information about the PHY transmission mode of the second device from a DEV capabilities field of the device capability information element.

3. The method of claim 1, wherein the information about the PHY transmission mode of the second device indicates at least one PHY transmission mode selected from the group including a single carrier (SC), on-off keying (OOK), and orthogonal frequency division multiplexing (OFDM).

4. The method of claim 3, wherein the information about the PHY transmission mode of the second device indicates one of OFDM transmission modes.

5. The method of claim 1, wherein the WPAN uses a frequency band of 60 GHz.

6. An apparatus for performing a piconet coordinator (PNC) handover,
   the PNC handover is performed by a first device to a second device in a wireless personal area network (WPAN), the apparatus comprising:
   a determination unit determining whether the first device and the second device use a same PHY transmission mode by referring to information about the PHY transmission mode of the second device;
   a decision unit deciding whether the first device can perform the PNC handover to the second device based on the determination result; and
   an extraction unit extracting information about the PHY transmission mode of the second device from an association request message that is received from the second device,
   wherein the extraction unit extracts information about the PHY transmission mode of the second device from a device capability information element of the association request message, and
   wherein a PHY transmission mode of the first device is at least one of a single carrier (SC), on-off keying (OOK), and orthogonal frequency division multiplexing (OFDM).

7. The apparatus of claim 6, wherein the extraction unit extracts information about the PHY transmission mode of the second device from a DEV capabilities field of the device capability information element.

8. The apparatus of claim 6, wherein the information about the PHY transmission mode of the second device indicates at least one PHY transmission mode selected from the group including a single carrier (SC), on-off keying (OOK), and orthogonal frequency division multiplexing (OFDM).

9. The apparatus of claim 8, wherein the information about the PHY transmission mode of the second device indicates one of OFDM transmission modes.

10. The apparatus of claim 6, wherein the WPAN uses a frequency band of 60 GHz.

11. A non-transitory computer readable medium comprising computer executable instructions, when executed, for directing a computing device to perform a method performing a piconet coordinator (PNC) handover, the PNC handover performed by a first device to a second device in a wireless personal area network (WPAN), the method comprising:
   determining whether the first device and the second device use a same Physical Layer (PHY) transmission mode by referring to information about the PHY transmission mode of the second device;
   deciding whether the first device can perform the PNC handover to the second device based on the determination result; performing the PNC handover to the second device based on the deciding result; and
   extracting information about the PHY transmission mode of the second device from an association request message that is received from the second device,
   wherein the extracting of information comprises extracting information about the PHY transmission mode of the second device from a device capability information element of the association request message, and
   wherein a PHY transmission mode of the first device is at least one of a single carrier (SC), on-off keying (OOK), and orthogonal frequency division multiplexing (OFDM).

12. Apparatus for performing a piconet coordinator (PNC) handover,
   the PNC handover is performed by a first device to a second device in a wireless personal area network (WPAN), the apparatus comprising:
   an association request processing unit to receive and process an association request message from an external device;
   an extraction unit extracting information about a PHY transmission mode of the external device from the association request message;

a handover processing unit to perform the handover to the external device;
a bus coupling each unit of the device;
at least one processor coupled to the bus; and
at least one non-transitory memory coupled to the bus to store instructions and to the at least one processor to execute and perform a method comprising:
  determining whether the first device and the second device use a same Physical Layer (PHY) transmission mode by referring to about the PHY transmission mode of the second device from a device capability information element of the association request message;
  deciding whether the first device can perform the PNC handover to the second device based on the determination result; and
performing the PNC handover to the second device based on the deciding result,
  wherein a PHY transmission mode of the first device is at least one of a single carrier (SC), on-off keying (OOK), and orthogonal frequency division multiplexing (OFDM).

* * * * *